March 31, 1970  J. N. MODESTI  3,503,573
DISK FLYING CRAFT
Filed Feb. 24, 1967  4 Sheets-Sheet 1

INVENTOR.
James N. Modesti
BY
Polachek & Saulsbury
ATTORNEYS

March 31, 1970 J. N. MODESTI 3,503,573
DISK FLYING CRAFT
Filed Feb. 24, 1967 4 Sheets-Sheet 2
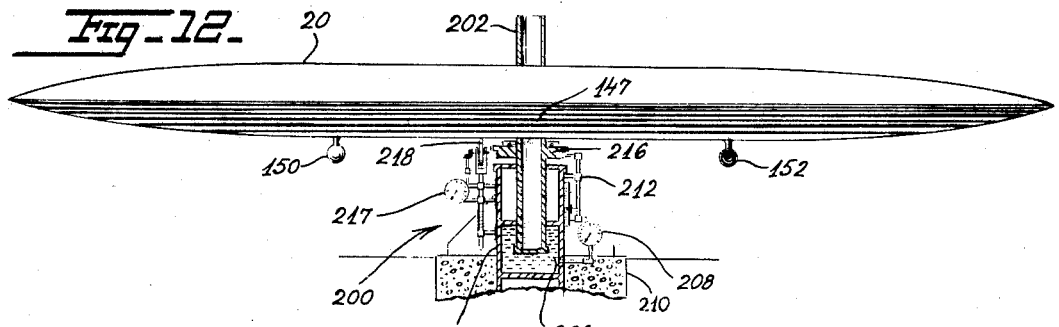
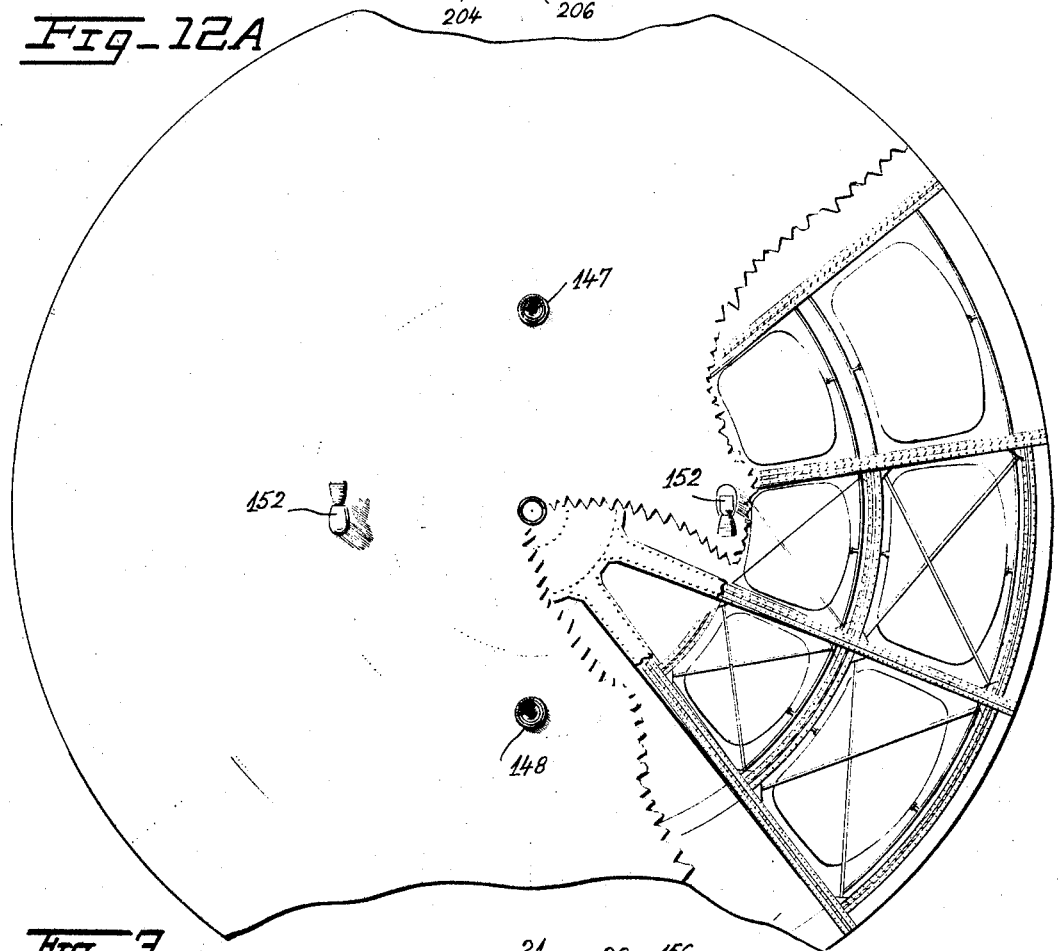
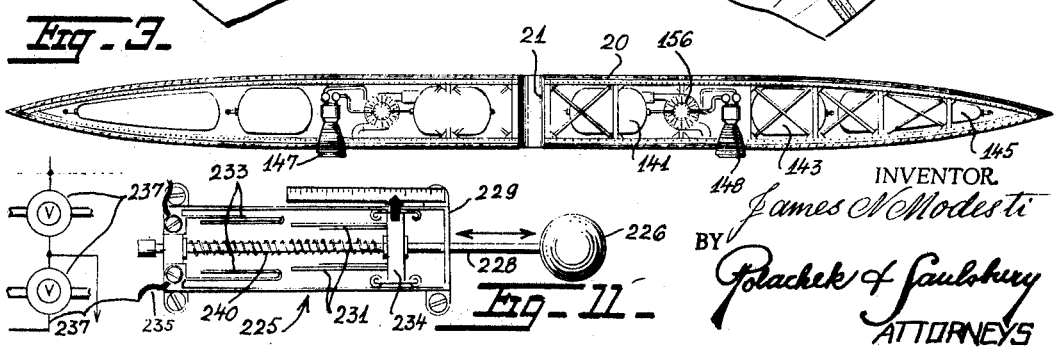
INVENTOR.
James N. Modesti
BY Polachek & Saulsbury
ATTORNEYS March 31, 1970 J. N. MODESTI 3,503,573
DISK FLYING CRAFT Filed Feb. 24, 1967 4 Sheets-Sheet 3

INVENTOR.
James N. Modesti
BY
Polachek & Saulsbury
ATTORNEYS

March 31, 1970
J. N. MODESTI
3,503,573
DISK FLYING CRAFT
Filed Feb. 24, 1967
4 Sheets-Sheet 4
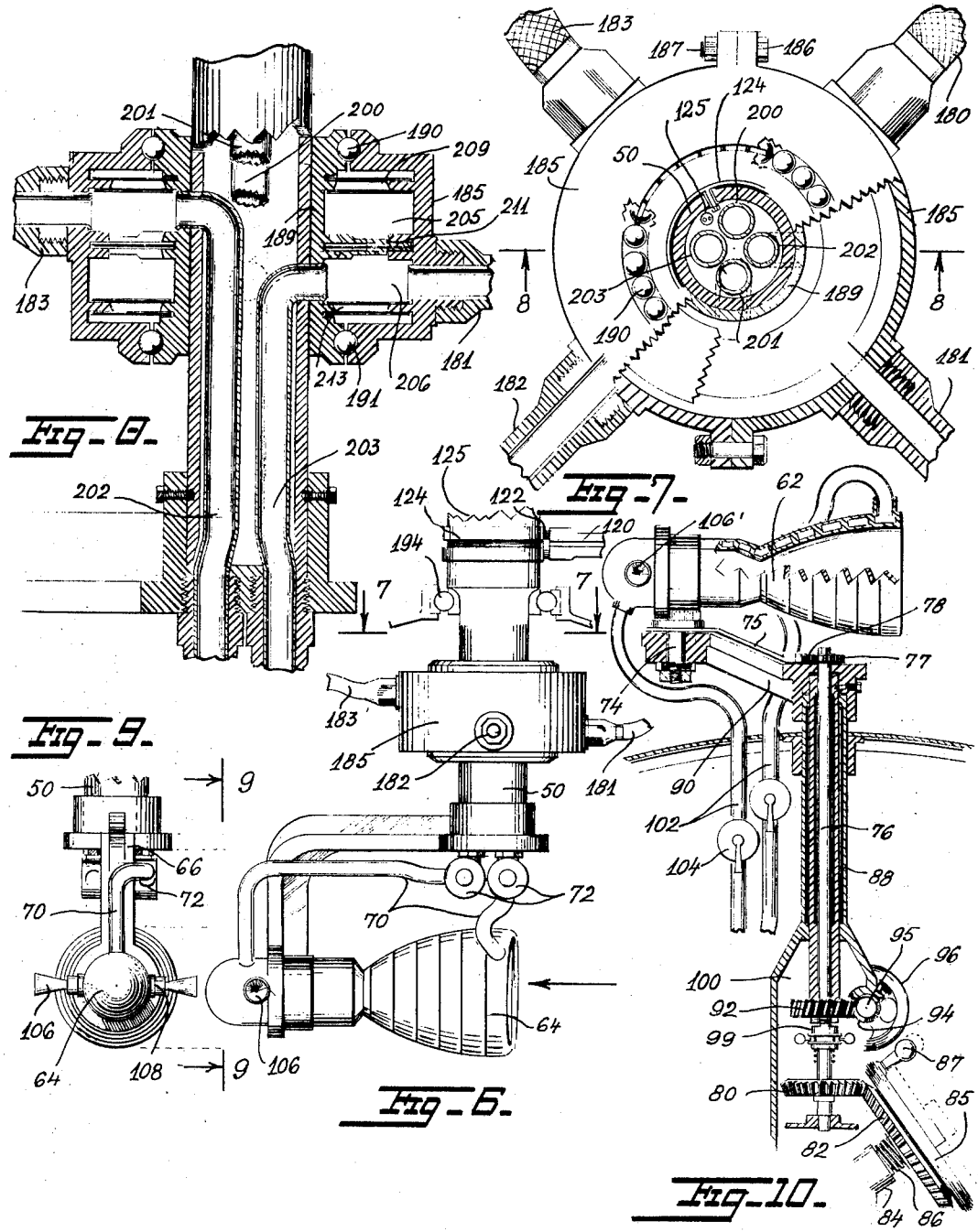
INVENTOR.
James N. Modesti
BY
Polachek & Saulsbury
ATTORNEYS United States Patent Office 3,503,573
Patented Mar. 31, 1970

3,503,573
DISK FLYING CRAFT
James N. Modesti, Brooklyn, N.Y.
(230 W. 76th St., New York, N.Y. 10023)
Filed Feb. 24, 1967, Ser. No. 618,523
Int. Cl. B64c 29/00, 39/00
U.S. Cl. 244—12
11 Claims

ABSTRACT OF THE DISCLOSURE

The disclosure describes a flying aircraft or spacecraft having a spinning circular disc shaped wing and a centrally disposed spherical compartment—or cabin. Personnel are housed in the cabin and control operation of the craft. The craft includes retractable landing gear, manually controllable rocket or jet motors, control steering, spinning speed, axial inclination, landing and takeoff.

This invention relates to experimental and manned flying spacecraft and involves improvements over the flying craft described in my prior Patent 3,199,809. According to the invention and as a principal object thereof, there is provided a flying craft or vehicle that can under its own propulsion be launched upwardly from the ground and maneuvered while in flight in any direction by operation of controls inside the vehicle.

A second object is to provide an aircraft which can be launched from its own landing gear, the craft including a disc shaped wing which is spun by horizontally mounted and directed rocket motors and lifted by the rotative force of the disc assisted by vertically disposed and directed rocket motors.

A third object is to provide a flying aircraft or spacecraft having a circular disc spun around a generally spherical cabin, or compartment in which personnel is housed.

A fourth object is to provide a flying craft as described, wherein the cabin has unobstructed windows on top and bottom through which observations can be made.

A fifth object is to provide a flying craft as described, wherein the craft is provided with its own retractable landing and takeoff gear.

A sixth object is to provide a flying craft as described with one rocket or jet motor rotatable and revolvable on top of the cabin for steering the craft when in flight, and operable in cooperation with another fixed rocket motor underneath the cabin.

A seventh object is to provide a flying craft as described in which fuel tanks are contained in the hollow, circular spinning disc, some of the tanks being located closer to the center of the wing than the rocket motors or jet motors and being spun with the disc so that fuel is forced into the rocket motors and/or jet motors under pressure created by centrifugal forces generated by rotation of the disc and tanks.

An eighth object is to provide a flying craft as described, wherein the spherical cabin or compartment has a conical centrally located sleeve receiving and rotatably engaged with a conical post affixed to the circular disc, with synchronized motors for spinning the spherical cabin in a direction opposite to the direction of rotation of the circular wing.

A ninth object is to provide a flying craft as described with a turbine engine driving an electrical generator for powering electric motors on the disc and ball, for operating solenoid valves, for energizing fuel pumps, and for powering other electrical appliances in the craft.

Other objects are to provide a flying craft as described: Two jet nozzles on each guidance rocket motor with lateral pusher rockets on rocket motors; with novel mounting means for a spherical cabin, in a rotating circular disc; with novel steering means for the craft; with novel rotational speed control and stabilizing means; with a ball bearing mounted fuel transfer box for passing fuel from the spinning disc to the ball cabin; with novel means for rotating the cabin in a direction opposite to the direction of rotation of the disc; with novel retractable landing gear including articulated padded radial legs, with a track on which the disc can rotate while the legs bear on the ground; with an airlock door to the cabin and registering doors in the disc through which personnel can pass between the spherical cabin, and disc with means for storing food, liquid, fuel, water and oxygen in the disc and cabin; and with other novel features shown in the drawings and described below.

For a better understanding of the invention, reference is made to the following detailed description taken in connection with the accompanying drawings, wherein:

FIG. 3 is a cross sectional view of the flying craft taken on line 3—3 of FIG. 2, showing structural details of the wing alone, the fuselage or cabin being removed.

FIG. 6 is a side elevational view on an enlarged scale of the propellant passage box, bottom rocket guidance rocket motor and associated parts.

FIG. 7 is an enlarged cross sectional view taken on line 7—7 of FIG. 6, showing the ball bearing mounting of the propellant passage box, parts of the box being broken away.

FIG. 8 is a fragmentary vertical sectional view taken on line 8—8 of FIG. 7, showing internal structure of the propellant passage box and associated parts.

FIG. 9 is a fragmentary and elevational view taken on line 9—9 of FIG. 6, showing structure of the rocket or jet motor at the bottom of the fuselage.

FIG. 10 is a sectional view, partially in side elevation, of the rocket or jet motor on top of the fuselage, with associated operating gear train and manual controls.

FIG. 11 is a plan view of a centrifugally operated switch employed in the flying craft.

FIG. 12 is an elevational view of the circular wing per se without fuselage shown mounted on a testing stand including launching pole and associated gauges to measure weight, lift, height, and spinning speed, and FIG. 12A is a fragmentary, bottom plan view of FIG. 12.

Figure 1:
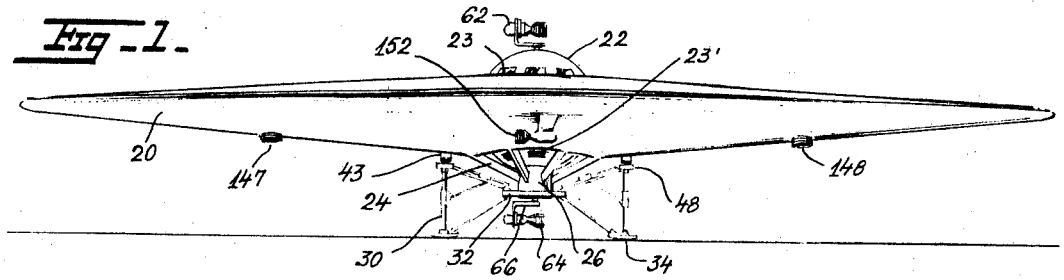
FIGURE 1 is an elevational view of the flying craft, shown resting on the ground with retractable landing gear in extended position supporting the craft.

Referring first to FIGS. 1–4, there is shown a flying craft having a circular disc shaped wing or disc 20. The disc has a central axial passage 21 in which is a spherical cabin 22. The cabin is rotatably journaled with respect to the disc. The diameter of the spherical cabin is greater than the maximum axial thickness or height of the disc so that upper and lower portions of the cabin project outwardly of the disc at its center. The disc is provided with a plurality of radially extending spider arms 24 rigidly affixed to the bottom of the disc and carrying an axially extending hollow frustoconical shaft or post 26; see FIG. 4. The cabin is free at the top so a clear view is had through windows 23. Other windows 23 are at the bottom of the cabin.

The spherical cabin has a frustoconical sleeve 28 extending axially of the cabin and concentric with post 26. At its upper end post 26 has roller bearings 27 extending circumferentially and engaged in a circumferential bearing race 28 near the upper end of post 26. By this arrangement the fuselage and disc are mutually rotatable with respect to each other.

Figure 2:
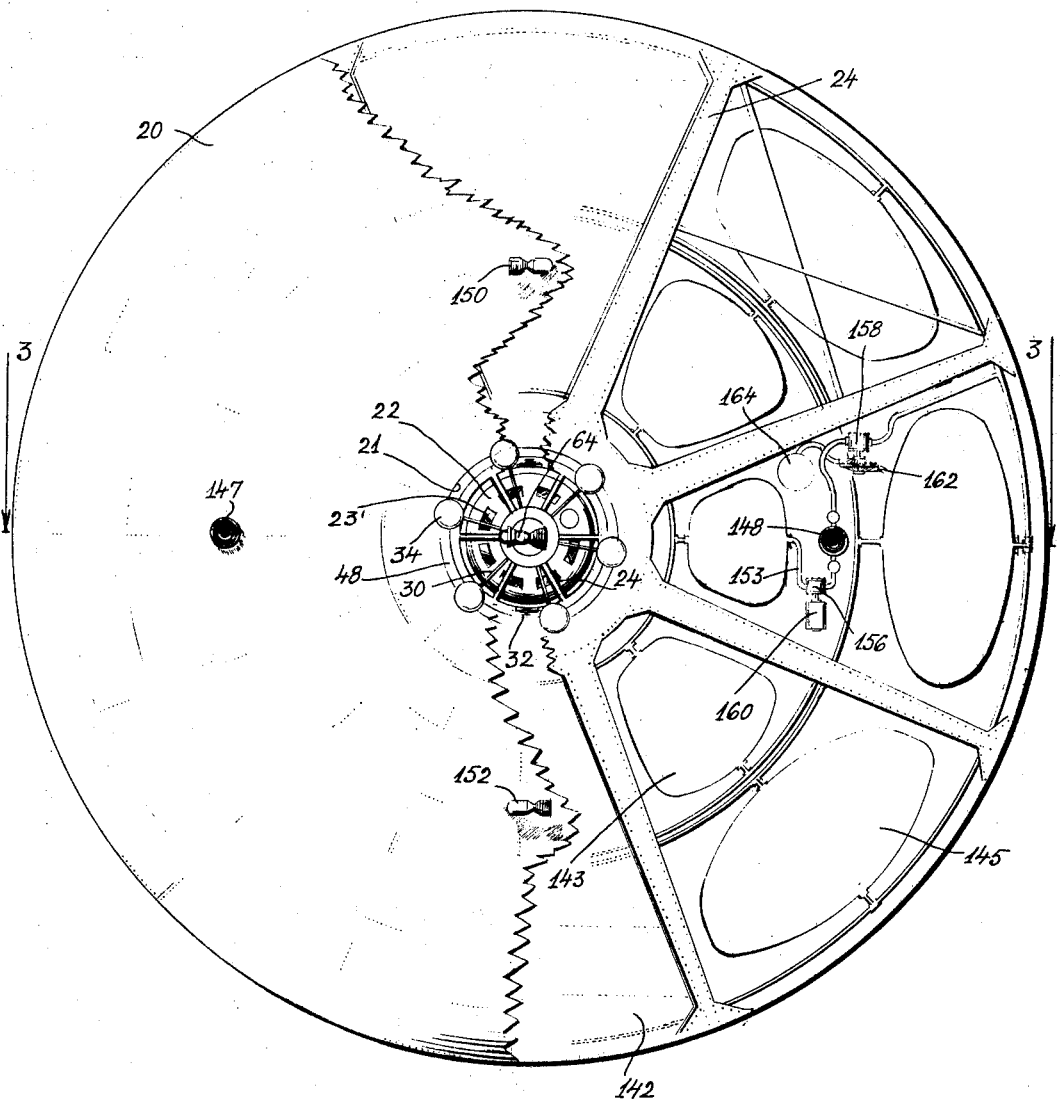
FIG. 2 is a bottom plan view of the flying craft, part of which is broken away to show internal constructional details of the rotatable wing.

A plurality of retractable legs 30 extend radially of post 26 at the bottom of the disc and cabin. Inner ends of the legs are pivotally attached to a circular rail or track 32. Outer ends of the legs carry circular pads 34 provided with shock absorbing springs 36. The legs can be retracted upwardly when the craft is in free flight. When the legs are extended as shown in FIGS. 1, 2 and at the bottom left side of FIG. 4, they elevate and support the disc and cabin above ground G. A motor 37 drives a geared linkage 38 at each leg to retract and extend the leg. Rail 32 has roller bearings 40 on top and ball bearings 41 on bottom. The bearings are engaged in with a channel shaped track 42 so that the post 26 can rotate with the disc when the legs 30 are stationary on the ground. Wheels 43 rotating on ball bearings 44 are provided at circumferentially spaced points near outer ends of the spider arms 24 underneath the disc. These wheels ride on a horizontal circular rail or platform 48 engaged underneath by roller bearings 49 projecting from the arms 24. The platform 48 is connected by bars 51 to rail 32. Disc 20 carrying ball cabin 22 can rotate while the legs are stationary and resting on the ground as wheels 43 roll on platform 48.

A hollow fixed shaft 50 extends axially inside of conical post 26. Post 26 carries a bevel ring gear 52. This gear can be engaged by bevel drive 53 or 54 on shafts 55 of two diametrically opposed axially horizontal synchronized motors 56, 57. The motors are located just above the center of the spherical cabin on opposite sides of a sleeve extension 59. The motors will rotate the cabin in a direction opposite to the direction of rotation of disc 20. Inner ends of shafts 55 are journaled in a bearing race 58 carried by shaft 50. Gears 53, 54 are provided with clutches 60 which permit disengagement of the gears from gear 52. Motors 56 and 57 will be used to turn the fuselage when guidance rocket motors 62 and 64 mounted above and below the fuselage are not running.

Figures 4, 5:
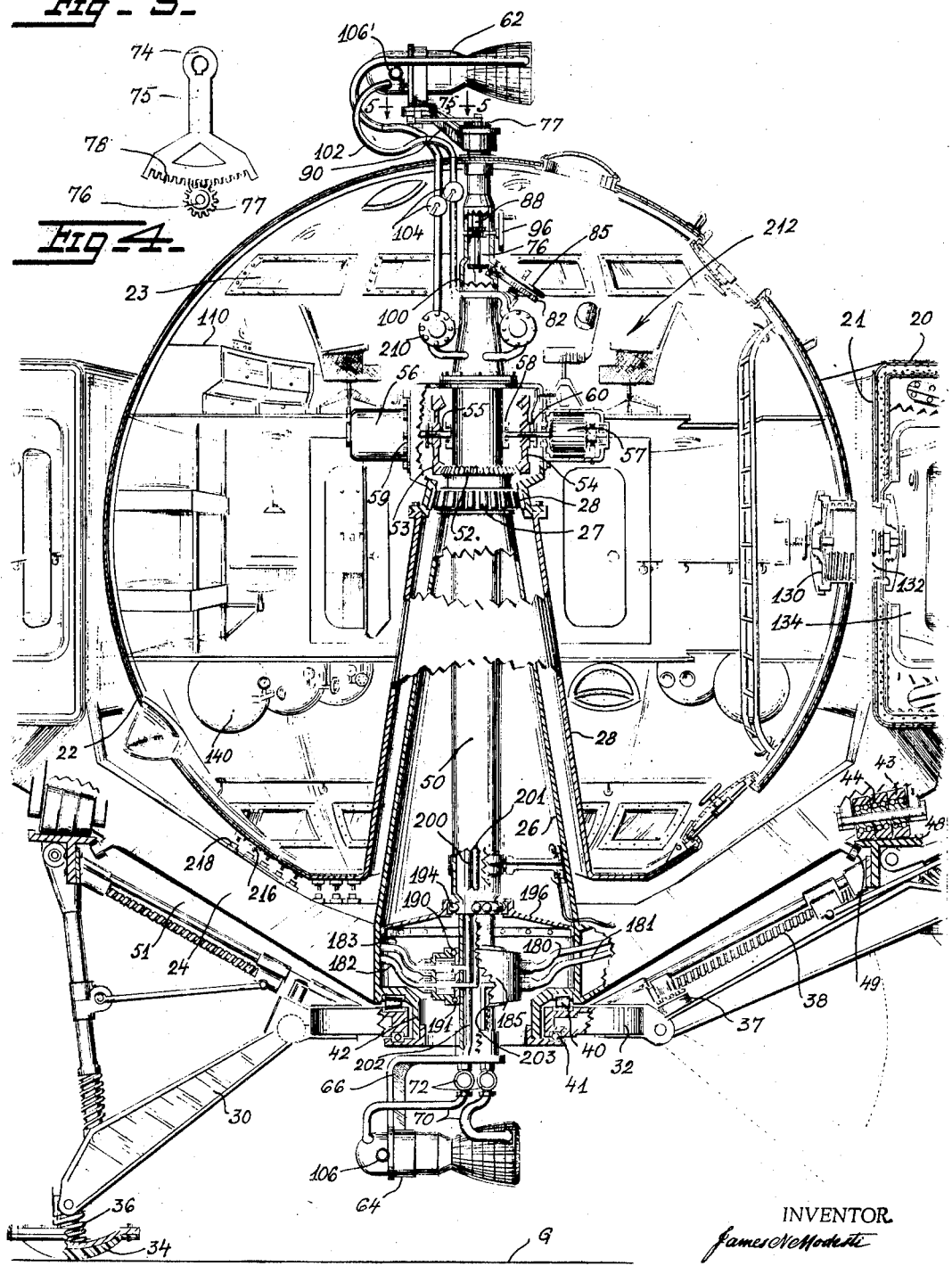
FIG. 4 is an enlarged diametral sectional view of the spherical fuselage with adjacent parts of the rotatable wing and landing gear, portions of the landing gear and fuselage being shown in side elevation.
FIG. 5 is a fragmentary sectional view taken on line 5—5 of FIG. 4 showing parts of the mounting structure for the upper rocket guidance motor. All motors are rocket.

Motor 64 is secured to shaft 50 in fixed position with respect to the cabin by an angle arm 66; see FIGS. 4, 6 and 9. The motor 64 is axially horizontal or perpendicular to the axially vertical axis of the shaft 50. Fuel is supplied to the motor by conduits 70 via solenoid controlled valves 72.

Motor 62 best shown in FIGS. 1, 4 and 10 is axially horizontal and is mounted on an axially vertical shaft 74. The motor can be rotated on stub shaft 74 by a bent arm 75 which extends radially outwardly of a shaft 76; see FIG. 5. Shaft 76 is axially vertical and carries a gear 77 at its upper end engaged with sector gear 78 formed on the inner end of arm 75. The lower end of shaft 76 carries a bevel gear 80 engaged with a bevel gear 82 on axially inclined shaft 84. Gear 82 is normally disengaged from gear 80 by a coil spring 86 on shaft 84, and is engaged with gear 80 when the pilot of the craft grasps handle 87 on handwheel 85 and presses downwardly on the handwheel.

Shaft 76 rotates inside of a sleeve 88. This axially vertical sleeve carries a radial crank arm 90 which supports the motor 62 and journals shaft 74. The sleeve 88 is secured to a gear 92 engaged with a worm 94 on shaft 95. A handwheel 96 is engaged on shaft 95. The handwheel 96 can be turned to rotate arm 90 360° so as to point the rocket motor 62 in any direction in a plane perpendicular to the vertical axis of the ball-cabin and disc. Handwheel 96 serves to align motor 62 axially parallel to motor 64 for all level horizontal flight and to effect other necessary maneuvers. For example by turning handwheel 96 the motor 62 will be properly oriented with respect to motor 64 to move the craft in for landing. Also it will be set for turning the disc 20 to a position where its diametral plan is horizontal if the craft should become tilted while in flight. It will be understood that it is necessary for the craft to be level when landing before the retractable legs 30 and pads are set down. This is done by pointing the top rocket motor 62 in the direction of the high point of tilt while the bottom rocket motor 64 points in the opposite direction. This will cause the craft to assume a level position. By continuing this maneuver, it is possible to turn the craft completely around while it is in flight. Normally the thrust of motor 64 in cooperation with motor 62 will stabilize the cabin 22 and keep it from turning by counteracting the torque produced by spinning disc 20.

Handwheel 85 is more frequently used than handwheel 96. Handwheel 85 is used by the pilot to keep the craft on course.

By turning the handwheel slightly more or less, any deviation in attitude of the cabin can be corrected. The thrust of motor 62 at an angle to the right or left of the axial direction in which motor 64 points will counter any drift of the craft off course. Normally, after use of handwheel 85, it is left in such a position that the rocket motor 62 is axially parallel to the crank arm 90. The shaft 76 will be held in the position set by a clutch 99. Clutch 99 is operated by a small hand lever (not shown). The sleeve 88 and shaft 76 are all rotatably supported inside of housing 100 which is an axial extension of sleeve 28. Housing 100 together with hollow shaft 50 constitute a central spindle axially of the fuselage and outwardly through upper and lower end portions thereof. Conduits 102 convey fuel to motor 62 via hand valves 104.

The lower rocket motor 64 as shown in FIGS. 6 and 9 is provided with a pair of diametrically opposed jet nozzles 106 controlled by solenoid valves 108. These solenoid controlled valves as well as the other solenoid valves mentioned above are all actuated by pushbuttons (not shown) at the control console 110 in the cabin. The jet nozzles 106 can be used to turn the entire fuselage on the vertical axis of the craft. They can be operated independently of the rocket motors 62 and 64 which have their own solenoid controlled valves 72 and 104. Similar jet nozzles 106' are provided on motor 62.

In order to energize motors 56, 57, the solenoid valves, electrical lights and other electrical appliances in the fuselage, electric power is generated by a turbine driven electric generator (not shown) in the circular disc. Electric power is delivered inside the fuselage via a cable 120 which passes through one arm 24 and terminates in brush 122 which wipes two conductive rings 124 on shaft or spindle 50. The rings 124 are insulated from the shaft. Power supply line 125 is connected to the top of rings 124 and serves as the electric power source inside the cabin.

The ball or cabin is provided with an air-lock door 130 which aligns with door 132 to the inside of the disc 20 when the disc is stationary with respect to the ball- or cabin. Doors 132 open into a circular corridor 134 surrounding the inner wall of central passage 21; see FIG. 4. Normally adequate supplies of air, oxygen, water, etc. are contained in containers or tanks 140 inside the ball cabin. Additional supplies are contained in compartments 142 of the hollow disc which personnel of the craft can enter when the disc is stationary with respect to the fuselage.

The disc contains liquid fuel tanks 141, 143 and gas propellant fuel tanks 145. They provide fuel to the rocket motors 62, 64 on the fuselage and other rocket motors 147, 148, 150, 152 on the disc; see FIGS. 2, 3. Tanks 141 and 143 are located nearer the center of the wing than motors 147, 148, 150, 152 which are connected via pipes 153 and fuel pumps 156, 158 to the tanks. Motors 147, 148 are axially vertical and are located in diametrically opposed positions at the bottom of the wing and point downward. When they are running, they serve to lift the entire craft axially. When the disc is spinning liquid fuel can pass to motors 147, 148, 150, 152 under centrifugal force to relieve the fuel pumps.

The two axially horizontal rocket motors 150, 152 are mounted at the bottom of the disc in diametrically opposed positions, and are used to spin the wing. Motors 147, 148 are larger and more powerful than motors 150, 152 because they must supply greater output thrust in lifting the craft. Liquid fuel pumps 156 are driven by electric motors 160. Pressurized gas propellant tanks 145 have fuel pumps 158 driven by a turbine 162. The turbine is steam driven by a steam generator 164.

The manner in which fuel is conveyed to the rocket motors 62 and 64 in the cabin is best shown in FIGS. 4, 7, 8. Pressurized gas and liquid fuel passes via pipes 180–183 to a cylindrical fuel transfer box 185. The pipes extend through legs 24 anud enter the box at circumferentially spaced points clearly shown in FIG. 7. Box 185 is formed of two semicylindrical sections joined by nuts and bolts 186, 187. The box rotates with post 26 and wing 20. The box rotates around sleeve 189 on shaft 50. Ball bearings 190, 191 above and below the box facilitate rotation of the box. Other ball bearings 194 between shaft 50 and cross plate 196 attached to the base of post 26 facilitate rotation between the shaft and post. Inside of hollow shaft 50 are four pipes 200–203. Two pipes 200, 201 open respectively into upper and lower chambers 205, 206 in the box 185. Fuel supply pipes 180, 183 are connected to the upper chamber. Fuel supply pipes 181, 182 are connected to the lower chamber. Pipes 200, 201 extend upwardly to fuel pumps 210 supported outside of housing 100. Pipes 90 are connected to the fuel pumps 210 and are connected via valves 104 to motor 62. Pipes 202, 203 open into the upper and lower chambers 205, 206 respectively and extend down through shaft 50 to valves 72. Pipes 70 convey the fuel to the lower rocket motor 64. Sealing rings or washers 209, 211, 213 in box 185 seal off the chambers from each other and form the exterior of the box. The fuel supply system is arranged for a dual propellant fuel system. If a monopropellant system is used, the system can be simplified by providing only one chamber in box 185 and only two pipes leading from the box to the upper and lower motors respectively. Of course, if a tripropellant system is used, then another chamber will have to be added to box 185 and further piping will be required. All the valves may be solenoid operated, but the upper valves 104 can be manually operated since they are conveniently accessible inside the control room 212 of the cabin.

When the craft is on the ground, the ball-compartment can be turned a fraction of a turn by operating motors 56, 57 or motor 62. A plurality of fingers 216 carried by the ball as shown in FIG. 4 will engage trip switches or circuit breakers 218 mounted on one arm 24 of the disc. This will close or operate these switches so as to start the pumps which supply fuel to motors 150, 152. The disc will then start to turn and will continue turning until a predetermined speed is reached when the motors will be cut off. This is accomplished by a centrifugal switch 225 shown in FIG. 11, cuts off solenoid valves 237, controlling flow of fuel to motors 150, 152. These valves are similar to valves 72 shown in FIG. 6 which control flow of fuel to motor 64. Switch 225 has a ball 226 secured to the end of shaft 228. Shaft 228 slides in a frame 229 against tension in spring 240. Ball 226 pulls shaft 228 to the right as viewed in FIG. 11 to close contacts 231 with contacts 233. Contacts 231 are carried by insulation bar 234 which moves shaft 228. When the ball moves centrifugally to the right as shown in FIG. 11 due to rotation of switch 225 disc 20, normally closed contacts 231, 233 open and the power supply circuit of the solenoid valves 237 controlling flow of fuel to motors 150, 152 will open to cut off the motors. Contacts 233 are connected to wires 235 which are in circuit with solenoid valves 237.

FIG. 12 shows an unmanned circular disc 20 resting on a test stand 200 for test purposes. Stand 200 has an axially vertical pole 202 which extends through the center of the disc. The lower end of pole 202 floats in a closed cylinder 204 containing a suitable liquid 206. A pressure gauge 208 is connected to cylinder 204 in communication with liquid 206. The scale reading of the gauge 208 is an indication of the weight of the wing. The cylinder 204 is embedded in a solid concrete base 210 to bear the weight of the wing. A vertical height gauge 212 on the side of the cylinder 204 has a finger engaged with platform 216 on which the disc rests. The liquid 206 can be supplied to cylinder 204 from a supply tank under pressure so that pole 202 and platform 216 will rise with the wing when vertically directed motors 147 and 148 are turned on. Gauge 212 will indicate the extent of lift of the wing. A tachometer 217 is provided on the assembly. This tachometer has a wheel 218 rolling along the underside of wing when it spins. The wing will be spun when horizontally directed motors 150, 152 are turned on. The apparatus shown in FIG. 12 can thus be used to measure weight, lifting action and rotational speed.

It will now be clear, that the flying craft propels itself upwardly by employing its own vertically directed rocket motors. It is kept aloft when in air by forces under the rotating disc. It is steered by operation of the handwheels 85 and 88. Handwheel 85 is employed like the steering wheel of any conventional vehicle to turn the craft to the right or left when the steering wheel is turned right or left. The craft is brought in for a landing by appropriately controlling the firing of the vertically and horizontally directed rocket motors 147, 148 and 150, 152. The retractable legs are extended and the craft sets down on its resilient pads, while the wing keeps spinning until it decelerates to a stop. The craft will have to be made of a certain size required for air or space flights to carry as large an operating crew and as many passengers as desired.

While I have illustrated and described the preferred embodiments of my invention, it is to be understood that I do not limit myself to the precise construction herein disclosed and that various changes and modifications may be made within the scope of the invention.

What is claimed is:

1. A flying craft comprising a diametrally-horizontal circular-foil disc, said disc having a central opening extending between top and bottom sides thereof, a spherical or ball-shaped cabin disposed in said opening with diametrically opposite portions of said ball shaped cabin extending outwardly above and below said sides respectively of the disc and coupling means rotatably coupling the disc and ball shaped cabin so that the disc is rotatable around the ball compartment, said coupling means comprising a cone shaped sleeve extending diametrically inward of said ball shaped cabin and terminating at a point above the center of the ball shaped cabin, a plurality of radially-extending arms secured to the underside of the disc and extending underneath said opening, a conical hollow shaft supported by said arms and nested in said sleeve, and bearing means mutually and rotatably engaging apical portions of said shaft and sleeve, so that the disc is journaled to rotate with respect to the ball shaped cabin and vice versa.

2. A flying craft as recited in claim 1, further comprising rocket motors mounted to the disc and oriented to direct forces in a plane parallel to the diametral plane of the disc for rotating the same around its axis, other rocket motors mounted to the disc and oriented to direct forces in a direction parallel to the axis of the disc for elevating the disc and ball, hollow shaft means defining a central spindle extending axially of the conical sleeve and shaft and outwardly of said opposite portions of the ball shaped cabin, means securing said spindle to the sleeve, other bearing means journaling said shaft to rotate around said spindle, a first directional guidance rocket motor mounted to one end of said spindle underneath the ball shaped cabin, a second directional guidance rocket motor mounted to the other end of the spindle above the cabin, means for revolving at least one of the directional guidance motors a predetermined radial distance from and around the axis of the spindle, and means for rotating said one directional guidance motor around another axis spaced said radial distance from the axis of the spindle, whereby any angle of tilt of the disc from a horizontal position can be corrected, and whereby the craft can be driven in a direction perpendicular to the central axis of the disc, all by cooperative action of the two directional guidance motors.

3. A flying craft as recited in claim 1, further comprising a plurality of retractable radially extending circumferentially spaced legs underneath the disc for supporting the disc and ball shaped compartment above the ground, a first ring, said legs being pivotally connected to said ring, bearings journaling said shaft rotatably to the ring for rotation thereon, a circular platform, linkage means connecting said legs and platform under the disc, and wheels rotatably supported by said arms and rolling on said platform, so that the disc is rotatably on said ring and platform when the legs are extended and bearing upon the ground.

4. A flying craft as recited in claim 2, further comprising diametrally opposed synchronized motors supported by said spindle, and gear means driven by the motors and engaged with said shaft so that the spherical-cabin can be spun in a direction opposite to the direction of rotation of the disc for keeping the fuselage stationary with respect to earth when the disc is rotating around the ball shaped cabin.

5. A flying craft as recited in claim 2 further comprising a cylindrical fuel transfer box rotatably journaled on said spindle, fuel storage containers in said disc, pipes connecting said containers to said box, said spindle having lateral openings communicating with said box, and other pipes extending from the openings in the spindle to the directional guidance motors for conveying fuel thereto from the fuel transfer box while the disc is rotating around the ball.

6. A flying craft as recited in claim 1, wherein said cabin has windows at its upper side above the wing providing views unobstructed by any connections between the ball and disc.

7. A flying craft as recited in claim 1, wherein said spherical-cabin has at least one air-lock door and said disc has at least one other door alignable with the airlock door in the spherical cabin to provide access and passage between for personnel between the ball and disc.

8. A flying craft as recited in claim 2, further comprising pairs of jet nozzles on the directional guidance rocket motors oriented to direct forces laterally of the directional guidance motors for moving these motors to right or left.

9. A flying craft as recited in claim 2, wherein the means for revolving said one directional guidance motor around the spindle comprises a crank arm supporting said one direction guidance motor and journaled to rotate on the spindle at its upper end, a sleeve shaft connected to said crank arm and extending axially of the spindle, a manually rotatable hand wheel, and gear means operatively connecting the handwheel to the sleeve shaft, whereby turning the handwheel revolves said one direction guidance motor at the end of and with said crank arm around the axis of the spindle.

10. A flying craft as recited in claim 9, further comprising a further shaft extending axially of said sleeve shaft, another arm coupled to said one directional guidance motor to rotate the same with respect to the crank arm, other gear means operatively connecting said further shaft and said other sleeve, another handwheel and further gear means connecting said other handwheel and said further shaft, whereby turning the other handwheel rotates said one directional guidance motor with respect to the crank arm.

11. A flying craft as defined in claim 1 wherein means is provided for automatically cutting off the motors driving the disc around, said means including a centrifugal switch having a spring pressed shaft, a ball carried on one end thereof, said ball adapted to pull the shaft in one direction, fixed electrical contacts, movable electrical contacts carried by the shaft and adapted to contact the fixed contacts, centrifugal rotation of the ball in one direction being adapted to open the fixed and movable contacts breaking the electrical circuit controlling the flow of fuel to the motors.

References Cited

UNITED STATES PATENTS 3,199,809   8/1965   Modesti _____ 244—12

MILTON BUCHLER, Primary Examiner

J. E. PITTENGER, Assistant Examiner

U.S. Cl. X.R.

244—23